J. R. McGIFFERT.
VALVE.
APPLICATION FILED FEB. 21, 1916.
1,286,689.
Patented Dec. 3, 1918.
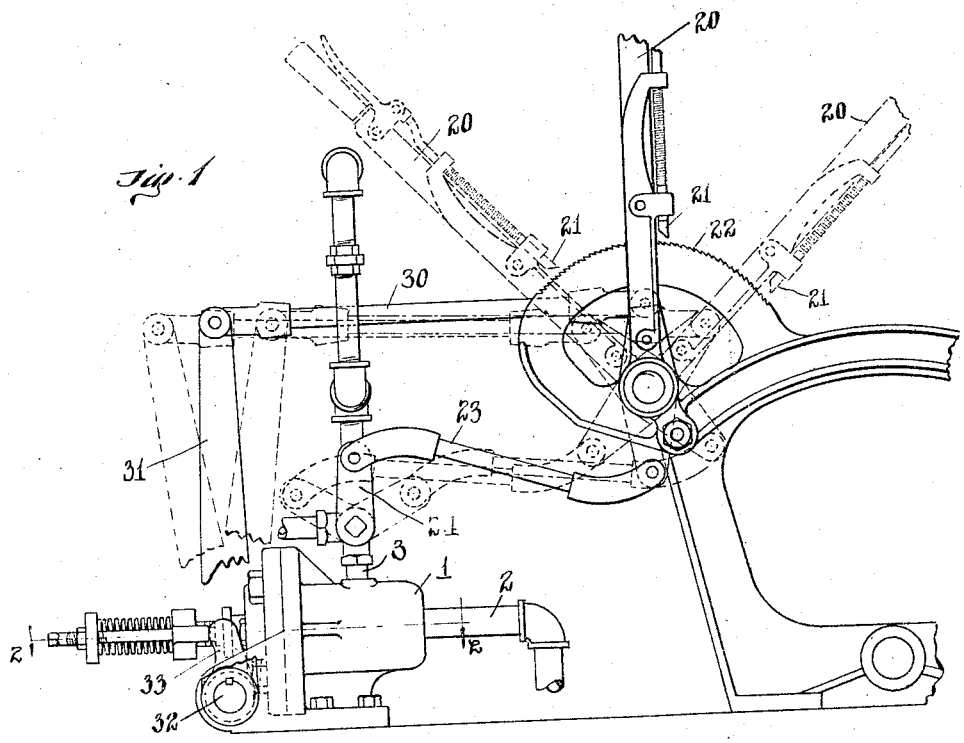
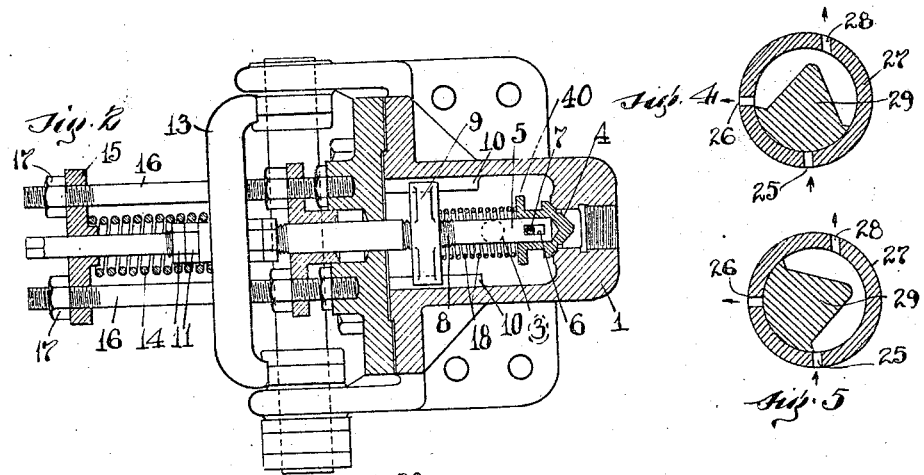
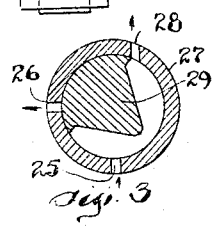
WITNESSES=
O. M. Kappler
Thos. H. Fay
INVENTOR
John R. McGiffert
BY Fay, Oberlin & Fay
ATTORNEYS

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MAINE.

VALVE.

1,286,689.   Specification of Letters Patent.   Patented Dec. 3, 1918.

Application filed February 21, 1916. Serial No. 79,517.

*To all whom it may concern:*

Be it known that I, JOHN R. McGIFFERT, a citizen of the United States, and a resident of Duluth, county of St. Louis, and State of Minnesota, have invented a new and useful Improvement in Valves, of which the following is a specification, the principle of the invention being herein explained and the best mode in which I have contemplated applying that principle, so as to distinguish it from other inventions.

The present improvements relate to valve mechanism for controlling the flow of fluid pressure to a fluid pressure actuated clutch such as is in common use in heavier machinery for engaging sheaves with the shafts which drive them. In this type of mechanism a very severe thrust is required in order to engage the clutch and for this reason fluid pressure is very suitable, but also in many cases the driving shaft, or rather one element of the clutch, is operating at a very high rate of speed and the engagement of the other of the first-named must be gradual in order not to lock the mechanism and cause the breaking of cables. It is for the purpose of securing such gradual operation of the clutch mechanism that the present valve mechanism has been designed. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation of the valve and operating mechanism for the same; Fig. 2 is a horizontal section on the line 2—2, in Fig. 1; and Figs. 3, 4 and 5 are sectional views through the valve controlling the discharge of the fluid pressure from the valve chamber proper, in its various positions.

In Fig. 1 there is shown a valve casing 1 having inlet and discharge ports to which are connected conduits 2 and 3, and provided in the conduit 3 is a three-way valve, the various positions of which are shown in Figs. 3 to 6. In the casing 1, which is preferably of cylindrical form, the valve port is normally closed by means of a reciprocable valve 4 which is attached by means of a lost motion connection to a valve stem 5. The lost motion connection referred to is shown in Fig. 2 and while it may be of various forms a convenient type is that here shown consisting of a longitudinal slot 6 formed in the valve stem and a pin 7 attached to the valve 4 and operating in this slot. The valve stem 5 is threaded at 8 and on this threaded portion there is received an adjusting collar 9 which is prevented from rotating with respect to the casing by means of guides 10 therein, which engage longitudinal grooves in the edges of the collar.

The valve stem 5 extends exteriorly of the casing, and adjustably mounted on such external portion by means of adjusting nuts 11 and 12 is a yoke 13 against which there contacts a coil spring 14 which rests at its other end against a plate 15, connected to the casing by means of the rods 16. The plate 15 is adjustably attached to the rods 16 by means of lock nuts 17 and its position may be varied to increase or decrease the tension of the spring 14 and consequently the pressure which this spring exerts against the yoke 13.

Between the collar 9 and a flange 40 which is formed on the valve 4, is a second spring 18 the tension of which may be varied by rotation of the valve stem, which varies the position of the collar 9 with respect to the valve and consequenly shortens or lengthens the spring 18, and changes the force that it exerts against the valve 4.

The valve 29 controlling the discharge of the fluid pressure from the chamber through the outlet 3 is shown in its various positions in Figs. 3 to 5, these figures all showing the sections through the valve and the ports which it controls. This valve is operated by means of a lever 20 which is held in any desired position by means of a pawl 21 which is spring-pressed into engagement with the notched quadrant 22, the lever 20 being connected by means of a link 23 to an arm 24 which is attached to the valve. The normal or closed position of this valve is shown in Fig. 4, and the position of the lever corresponding to this position on the valve, is shown in dotted lines in Fig. 1, at the right.

In such position the valve is covering a port 25 which is connected to the discharge conduit 3 from the casing and leaves open the ports 26 and 28 giving a clear passage from the clutch cylinder to the atmosphere, port 28 being connected to a conduit leading to the fluid pressure clutch or the mechanism which is to be controlled. When the lever 20 is moved to the vertical position shown in full lines in Fig. 1, the valve is turned to the position shown in Fig. 5, and thus opens communication between the inlet port 25 and port 28 leading to the clutch and closes the port to the atmosphere. With the lever shown in dotted lines at the left of Fig. 1 the valve 29 is in the position shown in Fig. 3, leaving the same ports uncovered as when lever 20 is in vertical position. When lever 20 is again returned to the position at the right of Fig. 1, the valve 29 returns to its closed position, cutting off the flow of fluid pressure from the casing and permitting the discharge of the fluid pressure which has operated the clutch through the ports 28 and 26.

Connected to the lever 20 is rod 30 operating a bar 31 mounted on a rock shaft 32, and on this rock shaft are mounted two cams 33 which bear against the inner side of the yoke 13 when the lever 20 is brought to a vertical position. As the cams 33 do not bear against the yoke 13 until the lever 20 is brought into a vertical position, the movement of the lever 20 from the position shown in the right on Fig. 1 to the central position has no other effect except to place the valve 29 in the proper position to permit the steam to flow from the regulating valve into the thrust cylinder of the clutch. When the lever 20 is moved to the left of its central position, the cams 33 are pressed against the yoke 13 and the spring 14 is thereby compressed and the valve stem 5 is moved to the left. The movement of this valve stem will have no direct effect upon the position of the valve by reason of the lost motion in the connection between the two, but that movement of the valve stem causes a movement of the adjusting collar 9 and thereby decreases the tension of the spring 18. (The spring 18 should have an initial pressure slightly in excess of the stem pressure in the line, while the initial tension in the spring 14 should be slightly in excess of the initial pressure on the spring 18, thus causing the valve stem 5 to bear lightly against the valve 4, insuring the closing of the steam port leading into the casing 1). Thus when movement of the valve stem to the left has decreased the tension of the spring 18 to a pressure below the pressure in the steam line, then the pressure in the steam line will open the valve 4 and steam will be admitted to the casing until the pressure in the casing plus the pressure on the valve 4, due to the tension of the spring 18, equals the pressure in the steam line, when the valve 4 will instantly close again. The pressure in the casing will in this case be transmitted to the clutch as the valve 29 will be in such position as to leave open the passage from the casing 1 to the clutch cylinder, the opening to the atmosphere through port 26 being closed. The pressure of the steam in the clutch cylinder and therefore the pressure on the engaging surfaces of the clutch will vary in the exact proportion that the lever 20 is moved backward from its central position.

The teeth on the ratchet 22 may be so proportioned that the drawing back of the lever 20 one notch will raise the pressure in the clutch cylinder a fixed number of pounds per square inch, and if the lever is left in that position the pressure will remain substantially constant. The instant that the pressure falls a slight amount due to condensation of steam or leakage in the clutch cylinder, the valve 4 will automatically open, restoring the pressure to the proper amount, whereupon the valve 4 will automatically close. Under many conditions it is very desirable that the friction clutch surfaces should engage with only sufficient force to carry the normal load without slippage, permitting slippage whenever abnormal resistance is encountered. This result can be accomplished perfectly with the arrangement described.

The advantages of my new valve are the smoothness of operation, and the ease with which the clutch members may be constantly held into engagement with any degree of pressure desired.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a valve casing having inlet and discharge ports, a valve for closing such inlet port, a stem having a lost motion connection with said valve, resilient means normally maintaining said stem in a position seating said valve, means for overcoming the tension of said resilient means exerted on said valve, and other resilient means adapted to maintain said valve in closed position when the tension exerted by said first named resilient means on said valve is overcome.

2. In a device of the character described, the combination of a valve casing having inlet and discharge ports, a valve for closing such inlet port, a stem having a lost motion connection with said valve, a spring normally maintaining said stem in a position seating said valve, means for overcoming the tension of said spring, and a second spring adapted to maintain said valve in closed position when the tension exerted by said first spring on said valve is overcome.

3. In a device of the character described, the combination of a valve casing having inlet and discharge ports, a valve for closing such inlet port, a stem having a lost motion connection with said valve, a spring normally maintaining said stem in a position seating said valve, a second spring interposed between said stem and said valve and adapted to maintain said valve in closed position, and means for overcoming the tension of said first-named spring exerted on said valve and simultaneously reducing the tension exerted by said second spring.

4. In a device of the character described, the combination of a valve casing having inlet and discharge ports, a valve for closing such inlet port, a stem having a lost motion connection with said valve, a spring normally maintaining said stem in a position seating said valve, a second spring interposed between said stem and said valve and adapted to maintain said valve in closed position, and means for moving said stem outward from said valve against the pressure of said first-named spring, and simultaneously gradually reducing the tension exerted by said second spring.

5. In a device of the character described, the combination of a valve casing having inlet and discharge ports, a valve for closing such inlet port, a stem having a lost motion connection with said valve, a spring normally maintaining said stem in a position seating said valve, a second spring interposed between said stem and said valve and adapted to maintain said valve in closed position, means for moving said stem outward from said valve against the pressure of said first-named spring, and simultaneously gradully reducing the tension exerted by said second spring, and means for adjusting the normal tension of both said springs.

Signed by me, this 17th day of February, 1916.

JOHN R. McGIFFERT.

Attested by—
 M. W. LEPP,
 GRACE R. MAGGARD.

Copies of this patent may be obtained for five cents each, by addressing the "Commissioner of Patents, Washington, D. C."